United States Patent
Alcantara Marte et al.

(10) Patent No.: US 10,549,478 B2
(45) Date of Patent: Feb. 4, 2020

(54) METHODS AND SURROUNDING SUPPORTS FOR ADDITIVE MANUFACTURING

(71) Applicant: GENERAL ELECTRIC COMPANY, Schenectady, NY (US)

(72) Inventors: Eliezer Manuel Alcantara Marte, Cincinnati, OH (US); Zachary David Fieldman, Cincinnati, OH (US); Thomas Sinnett, Cincinnati, OH (US); Daniel Joerger, Cincinnati, OH (US); Neal Dunham, Hamilton, OH (US); Mike Miller, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 4 days.

(21) Appl. No.: 15/041,973

(22) Filed: Feb. 11, 2016

(65) Prior Publication Data
US 2017/0232682 A1    Aug. 17, 2017

(51) Int. Cl.
B29C 64/40 (2017.01)
B33Y 10/00 (2015.01)
B33Y 40/00 (2015.01)
B29L 31/00 (2006.01)

(52) U.S. Cl.
CPC .......... *B29C 64/40* (2017.08); *B29L 2031/00* (2013.01); *B33Y 10/00* (2014.12); *B33Y 40/00* (2014.12)

(58) Field of Classification Search
CPC ... B29C 64/40; B29C 67/0092; B22F 3/1055; B22F 2003/1058; B33Y 10/00; B33Y 40/00
USPC .......................................................... 425/174
See application file for complete search history.

(56) References Cited

U.S. PATENT DOCUMENTS

| 699,533 A | 5/1902 | Jones |
| 4,863,538 A * | 9/1989 | Deckard ................. B22F 3/004 156/272.8 |
| 5,460,758 A | 10/1995 | Langer et al. |
| 5,529,471 A | 6/1996 | Khoshevis |
| 5,545,367 A * | 8/1996 | Bae ........................ B33Y 50/02 264/401 |

(Continued)

FOREIGN PATENT DOCUMENTS

| EP | 2 447 046 A2 | 5/2012 |
| EP | 2570595 A1 | 3/2013 |

(Continued)

OTHER PUBLICATIONS

Forderhase et al., "Reducing or Eliminating Curl on Wax Parts Produced in the Sinterstation™," 2000 System, (Abstract) pp. 94-100.

(Continued)

*Primary Examiner* — Jacob T Minskey
*Assistant Examiner* — Melody Tsui
(74) *Attorney, Agent, or Firm* — Dority & Manning, P.A.

(57) ABSTRACT

The present disclosure generally relates to methods for additive manufacturing (AM) that utilize support surrounding structures in the process of building objects, as well as novel surrounding support structures to be used within these AM processes. The support structure surrounds at least a portion of the object with a continuous thickness of powder disposed between the support structure and the object, the continuous thickness of powder having a maximum thickness that does not exceed 10 mm.

20 Claims, 5 Drawing Sheets

(56) References Cited

U.S. PATENT DOCUMENTS

| | | | |
|---|---|---|---|
| 5,656,230 A | 8/1997 | Khoshevis | |
| 5,837,960 A | 11/1998 | Lewis et al. | |
| 5,897,825 A * | 4/1999 | Fruth | B29C 67/0066 |
| | | | 264/308 |
| 6,471,800 B2 | 10/2002 | Jang et al. | |
| 7,381,921 B2 | 6/2008 | Hagemeister et al. | |
| 7,435,072 B2 | 10/2008 | Collins et al. | |
| 8,470,234 B2 | 6/2013 | Clark | |
| 8,506,836 B2 | 8/2013 | Szuromi et al. | |
| 8,684,069 B2 | 4/2014 | Mottin et al. | |
| 9,188,341 B2 | 11/2015 | McMasters et al. | |
| 2002/0062909 A1 | 5/2002 | Jang et al. | |
| 2008/0014457 A1 | 1/2008 | Gennaro et al. | |
| 2011/0278773 A1* | 11/2011 | Bokodi | B29C 67/0077 |
| | | | 264/497 |
| 2013/0071562 A1 | 3/2013 | Szuromi et al. | |
| 2013/0316084 A1 | 11/2013 | Szuromi et al. | |
| 2014/0251481 A1 | 9/2014 | Kroll et al. | |
| 2014/0335313 A1 | 11/2014 | Chou et al. | |
| 2015/0021379 A1 | 1/2015 | Albrecht et al. | |
| 2015/0093283 A1* | 4/2015 | Miller | A61F 2/3859 |
| | | | 419/55 |
| 2016/0238324 A1* | 8/2016 | Butcher | B29D 23/00 |
| 2016/0368224 A1* | 12/2016 | Ooba | B22F 3/008 |
| 2017/0203365 A1* | 7/2017 | Pays | B33Y 80/00 |
| 2017/0232511 A1 | 8/2017 | Fieldman et al. | |
| 2017/0232512 A1 | 8/2017 | Joerger | |
| 2017/0232670 A1 | 8/2017 | Joerger et al. | |
| 2017/0232671 A1 | 8/2017 | Fieldman | |
| 2017/0232672 A1 | 8/2017 | Fieldman et al. | |
| 2017/0232683 A1 | 8/2017 | Alcantara Marte et al. | |

FOREIGN PATENT DOCUMENTS

| | | | |
|---|---|---|---|
| EP | 2 583 774 A2 | 4/2013 | |
| EP | 3 015 251 A1 | 5/2016 | |
| EP | 3015251 A1 * | 5/2016 | B22F 3/008 |
| JP | 2015-107653 A | 6/2015 | |
| JP | 2015107653 A * | 6/2015 | |
| WO | WO 2014/071135 A1 | 5/2014 | |
| WO | 2014/208743 A1 | 12/2014 | |
| WO | 2015/042089 A1 | 3/2015 | |

OTHER PUBLICATIONS

Carter Jr. et al., General Electric, "Direct Laser Sintering of Metals", (Abstract), pp. 51-59.

Jacobson et al., "Practical Issues in the Application of Direct Metal Laser Sintering," (Abstract), pp. 728-739.

Extended European Search Report and Opinion issued in connection with corresponding EP Application No. 17155568.3 dated Jul. 3, 2017.

Machine Translation and Notification of Reasons for Refusal issued in connection with corresponding JP Application No. 2017-011740 dated Apr. 24, 2018.

* cited by examiner

PRIOR ART

METHODS AND SURROUNDING SUPPORTS FOR ADDITIVE MANUFACTURING

INTRODUCTION

The present disclosure generally relates to methods for additive manufacturing (AM) that utilize support structures in the process of building objects, as well as novel support structures to be used within these AM processes.

BACKGROUND

AM processes generally involve the buildup of one or more materials to make a net or near net shape (NNS) object, in contrast to subtractive manufacturing methods. Though "additive manufacturing" is an industry standard term (ASTM F2792), AM encompasses various manufacturing and prototyping techniques known under a variety of names, including freeform fabrication, 3D printing, rapid prototyping/tooling, etc. AM techniques are capable of fabricating complex components from a wide variety of materials. Generally, a freestanding object can be fabricated from a computer aided design (CAD) model. A particular type of AM process uses an energy beam, for example, an electron beam or electromagnetic radiation such as a laser beam, to sinter or melt a powder material, creating a solid three-dimensional object in which particles of the powder material are bonded together. Different material systems, for example, engineering plastics, thermoplastic elastomers, metals, and ceramics are in use. Laser sintering or melting is a notable AM process for rapid fabrication of functional prototypes and tools. Applications include direct manufacturing of complex workpieces, patterns for investment casting, metal molds for injection molding and die casting, and molds and cores for sand casting. Fabrication of prototype objects to enhance communication and testing of concepts during the design cycle are other common usages of AM processes.

Selective laser sintering, direct laser sintering, selective laser melting, and direct laser melting are common industry terms used to refer to producing three-dimensional (3D) objects by using a laser beam to sinter or melt a fine powder. For example, U.S. Pat. Nos. 4,863,538 and 5,460,758 describe conventional laser sintering techniques. More accurately, sintering entails fusing (agglomerating) particles of a powder at a temperature below the melting point of the powder material, whereas melting entails fully melting particles of a powder to form a solid homogeneous mass. The physical processes associated with laser sintering or laser melting include heat transfer to a powder material and then either sintering or melting the powder material. Although the laser sintering and melting processes can be applied to a broad range of powder materials, the scientific and technical aspects of the production route, for example, sintering or melting rate and the effects of processing parameters on the microstructural evolution during the layer manufacturing process have not been well understood. This method of fabrication is accompanied by multiple modes of heat, mass and momentum transfer, and chemical reactions that make the process very complex.

Figure 1:
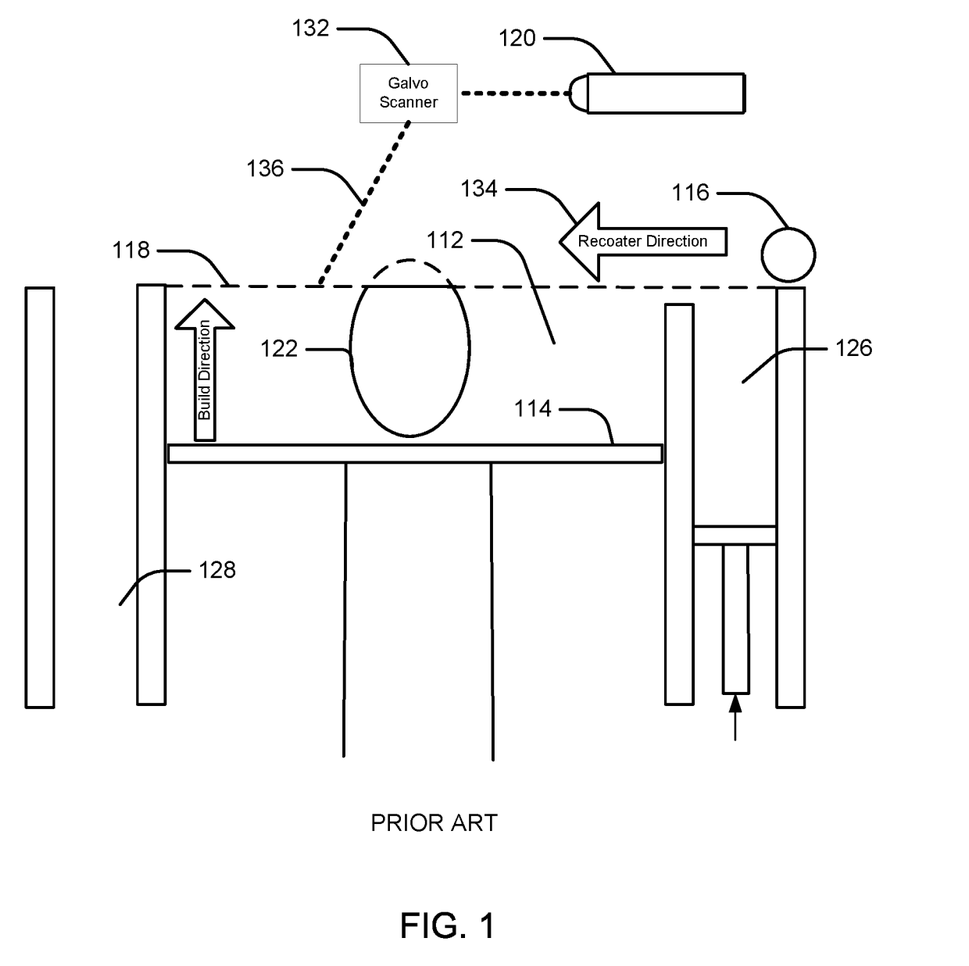
FIG. 1 is schematic diagram showing an example of a conventional apparatus for additive manufacturing.

FIG. 1 is schematic diagram showing a cross-sectional view of an exemplary conventional system 100 for direct metal laser sintering (DMLS) or direct metal laser melting (DMLM). The apparatus 100 builds objects, for example, the part 122, in a layer-by-layer manner by sintering or melting a powder material (not shown) using an energy beam 136 generated by a source such as a laser 120. The powder to be melted by the energy beam is supplied by reservoir 126 and spread evenly over a build plate 114 using a recoater arm 116 to maintain the powder at a level 118 and remove excess powder material extending above the powder level 118 to waste container 128. The energy beam 136 sinters or melts a cross sectional layer of the object being built under control of the galvo scanner 132. The build plate 114 is lowered and another layer of powder is spread over the build plate and object being built, followed by successive melting/sintering of the powder by the laser 120. The process is repeated until the part 122 is completely built up from the melted/sintered powder material. The laser 120 may be controlled by a computer system including a processor and a memory. The computer system may determine a scan pattern for each layer and control laser 120 to irradiate the powder material according to the scan pattern. After fabrication of the part 122 is complete, various post-processing procedures may be applied to the part 122. Post processing procedures include removal of excess powder by, for example, blowing or vacuuming. Other post processing procedures include a stress release process. Additionally, thermal and chemical post processing procedures can be used to finish the part 122.

The present inventors have discovered that the additive manufacturing process described above may present difficulties for objects having large height to width aspect ratios (e.g., tall objects). For example, tall objects may be prone to damage from a recoater arm because the tall object may act as a lever exerting force on a lower portion of the object. Accordingly, even if a tall object is connected to a build plate or otherwise vertically supported from underneath, the tall object may tip over or bend due to lateral forces.

In view of the above, it can be appreciated that there are problems, shortcomings or disadvantages associated with AM techniques, and that it would be desirable if improved methods of supporting objects and support structures were available.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

In one aspect, the disclosure provides a method for a method for fabricating an object, comprising: (a) irradiating a layer of powder in a powder bed to form a fused region, (b) providing a subsequent layer of powder over the powder bed by passing a recoater arm over the powder bed from a first side of the powder bed, and (c) repeating steps (a) and (b) until the object and at least one support structure is formed in the powder bed, wherein the support structure surrounds at least a portion the object with a continuous thickness of powder disposed between the support structure and the object, the continuous thickness of powder having a maximum thickness that does not exceed 10 mm.

These and other aspects of the invention will become more fully understood upon a review of the detailed description, which follows.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details.

Figure 2:
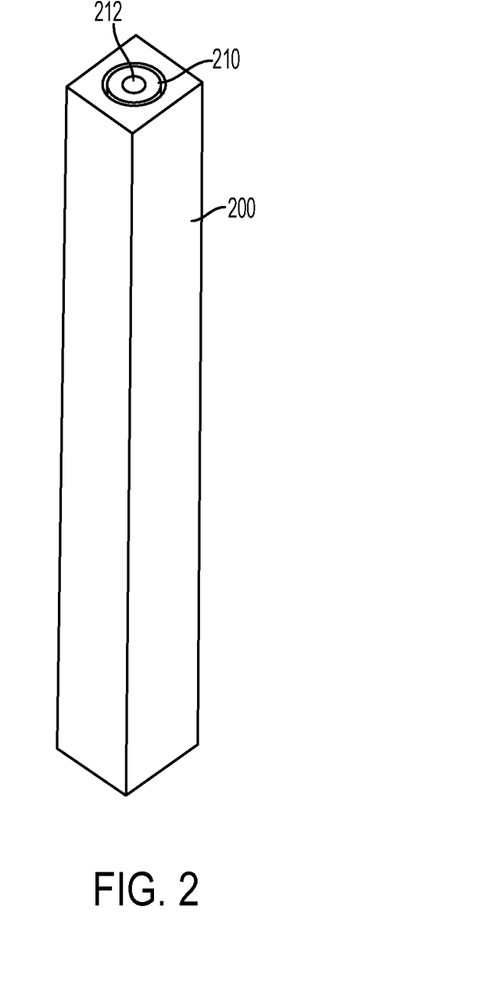
FIG. 2 illustrates a perspective view of an example of an object supported by a support structure in accordance with aspects of the present invention.
Figure 3:
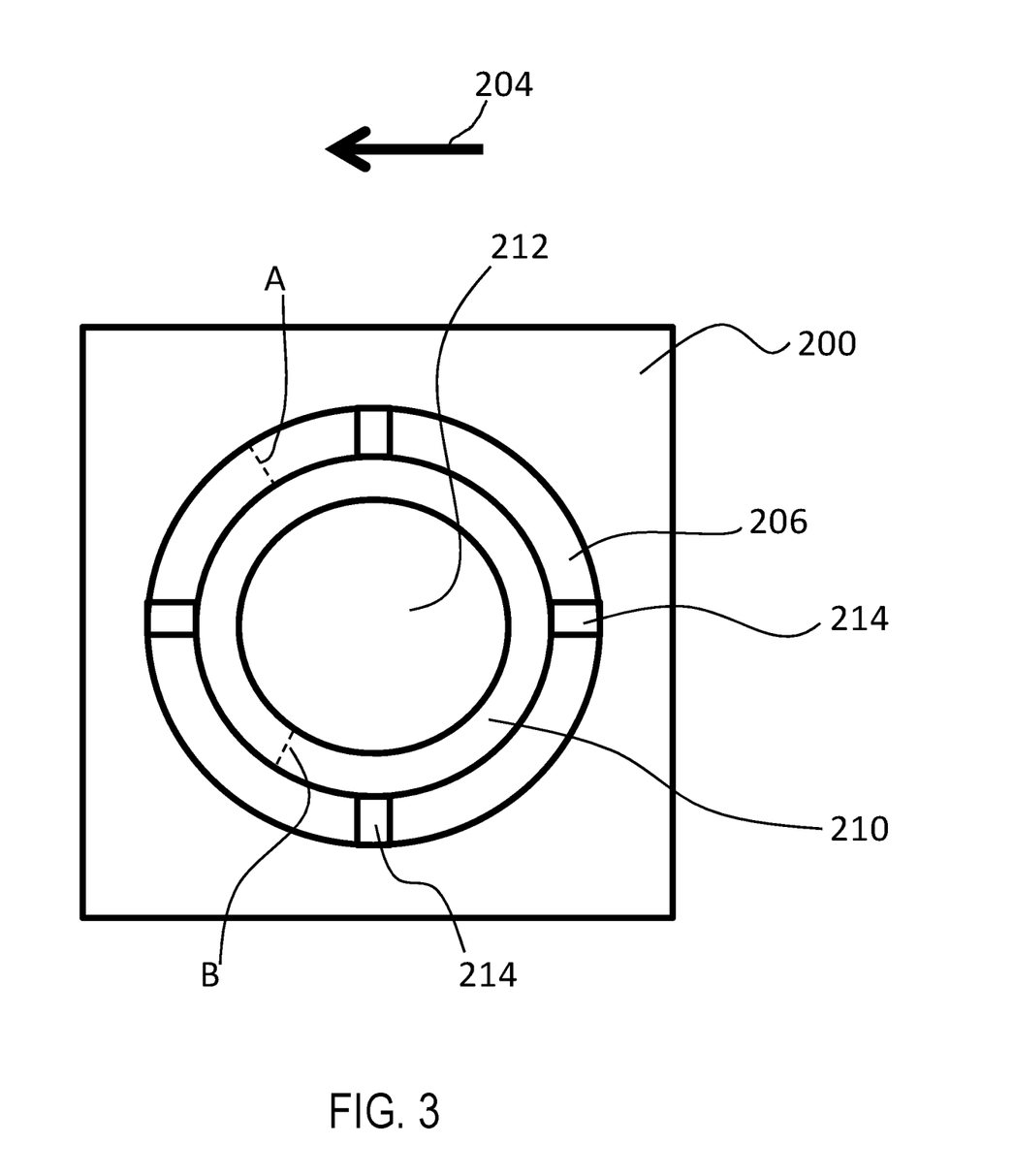
FIG. 3 illustrates top plan view of the example object and support structure of FIG. 2 in accordance with aspects of the present invention.

FIGS. 2 and 3 illustrates and an example support structure 200 surrounding an object 210. FIG. 2 illustrates a perspective view and FIG. 3 illustrates a plan view. The support structure 200 and the object 210 may be manufactured according to an AM process. For example, the apparatus 100 of FIG. 1 and method described above may be used. In this type of AM process, the object 210 is built layer-by-layer by selectively sintering or melting areas of the powder in the regions that form the object 210. The support structure 200 is built simultaneously with the object 210 by melting or sintering additional regions of the powder in the location of the support structure 200. The arrows 204 in FIG. 3 denotes the direction of the recoater arm as it provides a fresh layer of powder at each stage of the object's build. Preferably, the support structure 200 surrounds the object 210.

Upon completion of the AM process, the support structure 200 is removed from the object 210. In one aspect, the support structure 200 is attached along with the object to the build plate and may be detached from the build plate and discarded. The support structure 200 may alternatively be formed without attachment to the build plate as a free standing object within the powder bed. In addition, the support structure may include a point of attachment to the object 210 that may be readily broken away once the AM process is complete. This may be accomplished by providing a breakaway structure—a small tab of metal joining the object 210 and support structure 200. The breakaway structure may also resemble a perforation with several portions of metal joining the object 210 and support structure 200.

The removal of the support structure 200 from the object 210 may take place immediately upon, or during, removal of the object from the powder bed. Alternatively, the support structure may be removed after any one of the post-treatment steps. For example, the object 210 and support structure 200 may be subjected to a post-anneal treatment and/or chemical treatment and then subsequently removed from the object 210 and/or build plate.

The present inventors have found that certain objects may benefit from a support structure 200 that partially or completely surrounds the object 210 with a continuous powder layer in a space 216 between the support structure 200 and the object. In the example aspect illustrated in FIGS. 2 and 3, the support structure 200 has a square outer shape (e.g., the outer dimensions of a cross section of the support structure form a square) and a cylindrical inner shape 202 (e.g., the inner dimensions of a cross section of the support suture form a circle) that surrounds a cylindrical object 210. However, any shape may be suitable and will vary depending on the particular object being formed. For example, the outer shape and/or the inner shape of the support structure may have a rectangular shape, oval shape, oblong (e.g., stadium) shape, elliptical shape, crescent shape, teardrop, pie shape, and the like. The inner shape may correspond with the outer shape of the object. Generally, a square outer shape of the support structure provides improved structural support to the object. A square shape provides a sturdy base that minimizes the likelihood of toppling.

As illustrated in FIG. 2, the support structure 200 and the object 210 may each generally have a length/height several times its width. For example the aspect ratio of the length/height to width may be from about 15:1 to about 2:1 in one aspect, from about 12:1 to about 4:1 in another aspect, and about 10:1 to about 6:1 in another aspect. Preferably, the aspect ratio of the object may be about 2.5 or greater. That is, the length/height of the support structure and the object may be many times larger than their widths. An object being generally much longer/taller than wide is particularly benefited by a support structure that surrounds the object.

Because the object has a high aspect ratio, the object may become damaged or deform during the recoating step. In particular, the recoater arm travels in the direction of arrow 204. As the recoater passes across the object to even out/flatten the top layer of powder in the powder bed, the recoater arm may impart toppling forces or deformation forces onto the object. Thus, a hollow object with thin walls, high aspect ratio, and open ends is particularly benefited by a support structure surrounding the object with a continuous powder layer between the support structure and the object. Accordingly, as shown in FIGS. 2 and 3, the support structure 200 surround the object 210 with a space 216 full of powder between the object 210 and the support structure 200. During melting/sintering processes heat is also used which can thermally stress the object. The support structure surrounding the object with a continuous powder layer between the object and the support structure controls the thermal environment of the object, thus preventing distortion due to thermal stress. Controlling the thermal environment of the object also allows for control of grain structure, surface finish, and internal stress which is directly related to thermal stress.

As illustrated in FIG. 2, the support structure 200 may completely surround the length/height dimension of the object 210. However, as also seen in FIG. 2, the support structure 200 need not cover the end face of the object 210. While the bottom end face of the object 210 is not visible in FIG. 2, it may also not be covered by the support structure 200.

As best seen in FIG. 3, the support structure 200 may further include at least one connecting rib 214 that is integrally connected with the object 210. Other than the connecting ribs, as noted above, there may be a space 206 between the support structure 200 and the object 210. In the example aspect illustrated in FIG. 3, four connecting ribs 214 are illustrated connected to the surface of the object 210. While four are illustrated, less than four, e.g., 1, 2, 3 or more than 4, e.g., 5, 6, 7, 8, etc. may used. Furthermore, additional connecting ribs may be included along the length/height of the object 210. For example, at incremental distances along the length/height of the object 210, such as every $\frac{1}{16}$, $\frac{1}{8}$, $\frac{1}{6}$, $\frac{1}{5}$, $\frac{1}{4}$, or $\frac{1}{3}$, etc. of the length/height, another connecting rib or set of connecting ribs may be connected to the object 210. For example, if four connecting ribs are included along the circumference of the object 210 at given height, then another set of four (or more or less than four) connecting ribs may be included at every 1/16, 1/8, 1/6, 1/5, 1/4, or 1/3, etc. of the length/height.

In another aspect, the support structure 200 may not include any connecting ribs.

Whether there are ribs or no ribs, as noted above, the space 206 may include powder to provide a continuous powder thickness between the object and the support structure. The presence of the powder provides a mechanism for the support structure to support the object without the inner surface of the support structure contacting the object. The size of the space 206 may vary depending on the relative dimensions of the object. For example, a ratio (A:B) of a distance from the inner surface of the removable support to an outer surface of the object (A) to the outer thickness/width of the object (B) may be from about 1:1 to about 1:6, from about 1:2 to about 1:5, or from about 1:3 to about 1:4. In another example the ratio A:B may be about 1:3. In other words, the ratio of the width/thickness of the space 206 to the width/thickness of the object 210 may be the above-listed ranges. The continuous thickness of powder may have a maximum thickness that does not exceed 10 mm. For example in an example aspect the continuous thickness of powder may be 0.1 mm-10 mm, 0.5 to 5 mm, or 0.5 to 1 mm.

Figure 4:
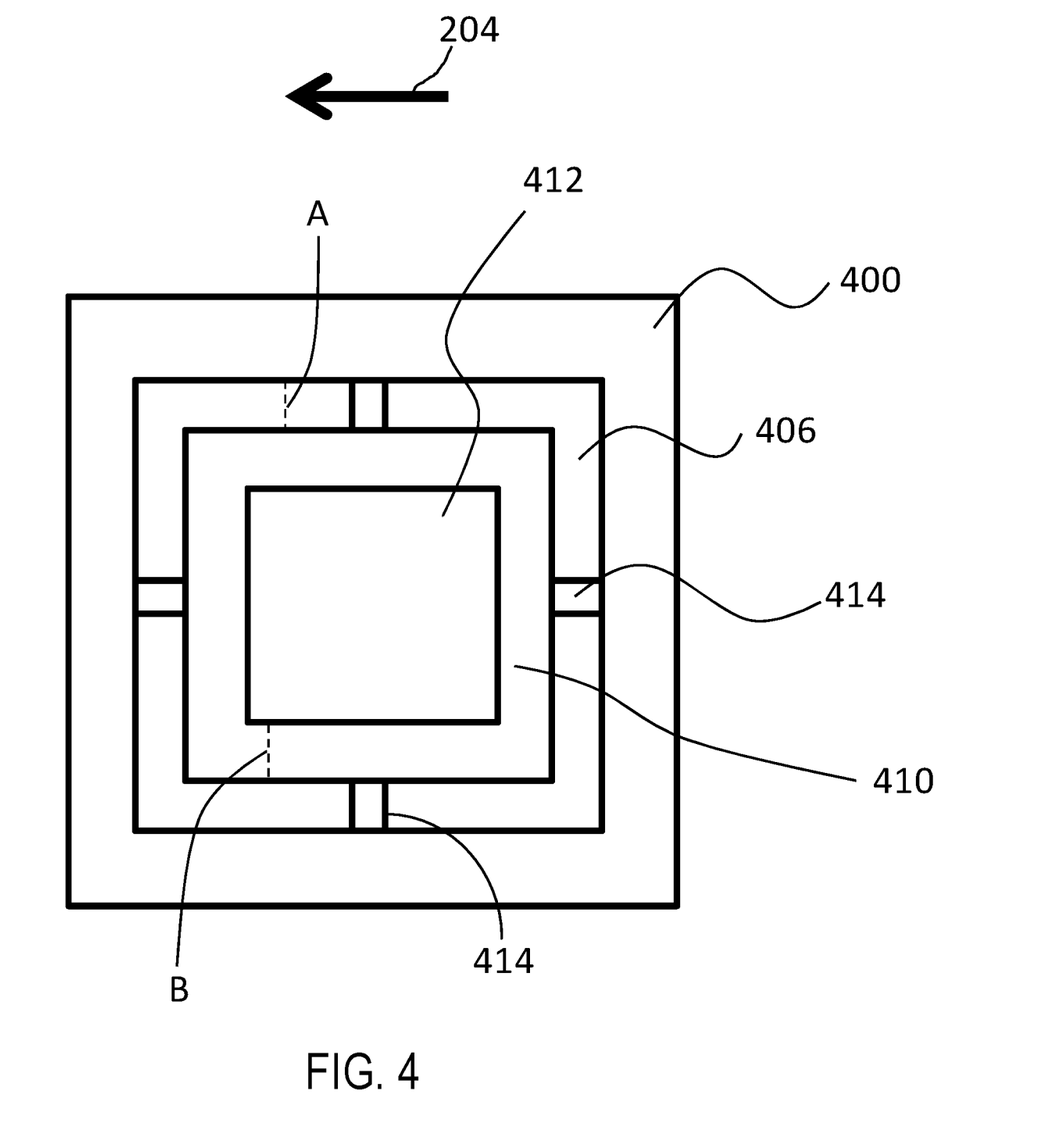
FIG. 4 illustrates top plan view of another example object and example support structure in accordance with aspects of the present invention.

FIG. 4 illustrates top plan view of another example object 410 and example support structure 400, where the support structure 400 has an outer and inner rectangular/square cross section and the object 410 has an outer and inner rectangular/square cross section. The support structure 400 may completely surround the length/height dimension of the object 410. However, the support structure 400 need not cover the end face of the object 410. The bottom end face of the object 310 may also not be covered by the support structure 400.

As best seen in FIG. 4, the support structure 400 may further include at least one connecting rib 414 that is integrally connected with the object 410. Other than the connecting ribs, there may be a space 406 between the support structure 400 and the object 410. In the example aspect illustrated in FIG. 4, four connecting ribs 414 are illustrated connected to the surface of the object 410. While four are illustrated, less than four, e.g., 1, 2, 3 or more than 4, e.g., 5, 6, 7, 8, etc. may used. Furthermore, additional connecting ribs may be included along the length/height of the object 410. For example, at incremental distances along the length/height of the object 410, such as every 1/16, 1/8, 1/6, 1/5, 1/4, or 1/3, etc. of the length/height, another connecting rib or set of connecting ribs may be connected to the object 410. For example, if four connecting ribs are included along the circumference of the object 410 at given height, then another set of four (or more or less than four) connecting ribs may be included at every 1/16, 1/8, 1/6, 1/5, 1/4, or 1/3, etc. of the length/height.

In another aspect, the support structure 400 may not include any connecting ribs.

Whether there are ribs or no ribs, as noted above, the space 406 may include powder to provide a continuous powder thickness between the object and the support structure. The presence of the powder provides a mechanism for the support structure to support the object without the inner surface of the support structure contacting the object. The size of the space 406 may vary depending on the relative dimensions of the object. For example, a ratio (A:B) of a distance from the inner surface of the removable support to an outer surface of the object (A) to the outer thickness/width of the object (B) may be from about 1:1 to about 1:6, from about 1:2 to about 1:5, or from about 1:3 to about 1:4. In another example the ratio A:B may be about 1:3. In other words, the ratio of the width/thickness of the space 406 to the width/thickness of the object 410 may be the above-listed ranges. The continuous thickness of powder may have a maximum thickness that does not exceed 10 mm. For example in an example aspect the continuous thickness of powder may be 0.1 mm-10 mm, 0.5 to 5 mm, or 0.5 to 1 mm.

Figure 5:
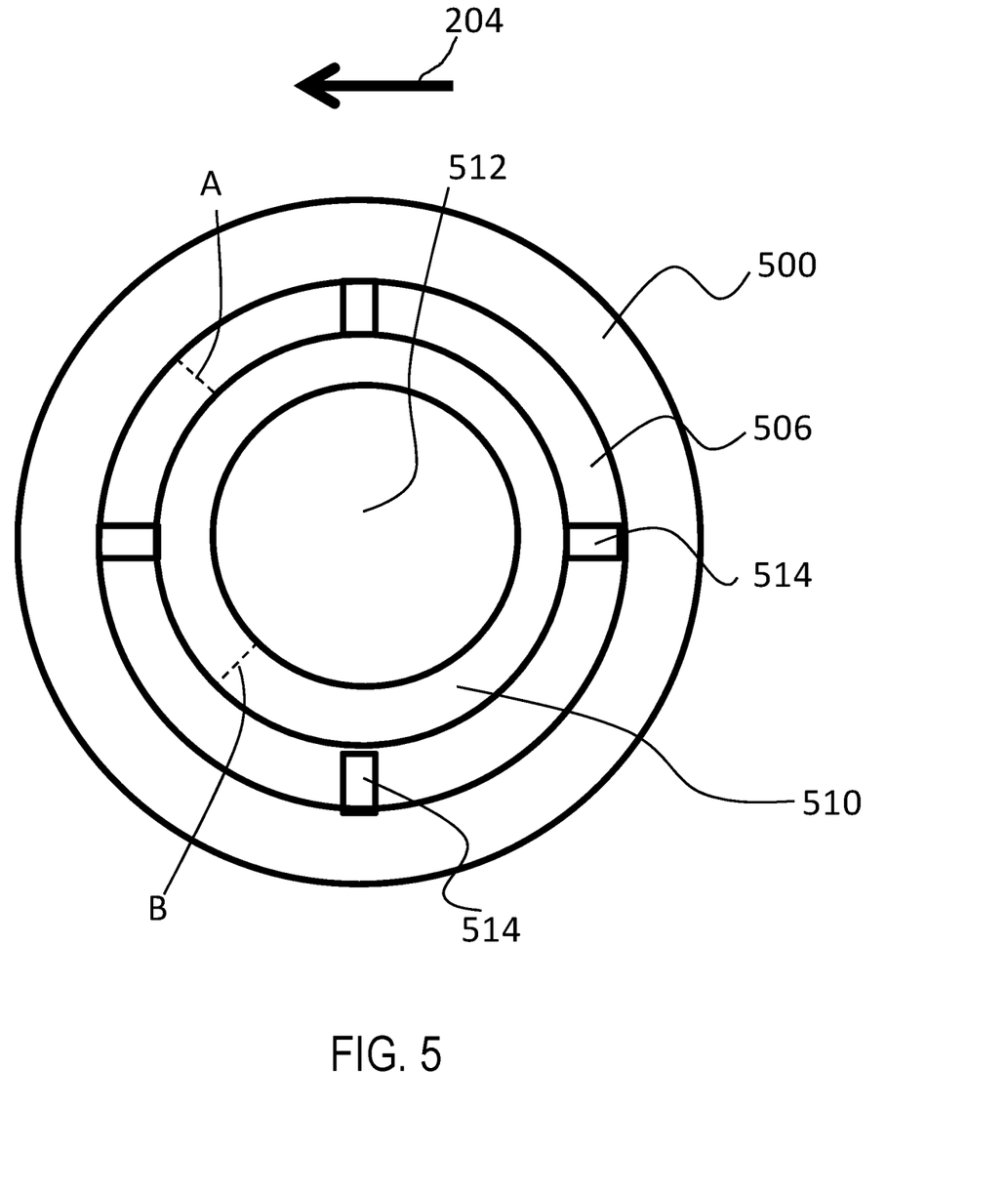
FIG. 5 illustrates top plan view of another example object and example support structure in accordance with aspects of the present invention.

FIG. 5 illustrates top plan view of another example object 510 and example support structure 500, where the support structure 500 has an outer and inner circular cross section and the object 510 has an outer and inner circular cross section. The support structure 500 may completely surround the length/height dimension of the object 510. However, the support structure 500 need not cover the end face of the object 510. The bottom end face of the object 310 may also not be covered by the support structure 500.

As best seen in FIG. 5, the support structure 500 may further include at least one connecting rib 514 that is integrally connected with the object 510. Other than the connecting ribs, there may be a space 506 between the support structure 500 and the object 510. In the example aspect illustrated in FIG. 5, four connecting ribs 514 are illustrated connected to the surface of the object 510. While four are illustrated, less than four, e.g., 1, 2, 3 or more than 4, e.g., 5, 6, 7, 8, etc. may used. Furthermore, additional connecting ribs may be included along the length/height of the object 510. For example, at incremental distances along the length/height of the object 510, such as every 1/16, 1/8, 1/6, 1/5, 1/4, or 1/3, etc. of the length/height, another connecting rib or set of connecting ribs may be connected to the object 510. For example, if four connecting ribs are included along the circumference of the object 510 at given height, then another set of four (or more or less than four) connecting ribs may be included at every 1/16, 1/8, 1/6, 1/5, 1/4, or 1/3, etc. of the length/height.

In another aspect, the support structure 500 may not include any connecting ribs.

Whether there are ribs or no ribs, as noted above, the space 506 may include powder to provide a continuous powder thickness between the object and the support structure. The presence of the powder provides a mechanism for the support structure to support the object without the inner surface of the support structure contacting the object. The size of the space 506 may vary depending on the relative dimensions of the object. For example, a ratio (A:B) of a distance from the inner surface of the removable support to an outer surface of the object (A) to the outer thickness/width of the object (B) may be from about 1:1 to about 1:6, from about 1:2 to about 1:5, or from about 1:3 to about 1:4. In another example the ratio A:B may be about 1:3. In other words, the ratio of the width/thickness of the space 506 to the width/thickness of the object 510 may be the above-listed ranges. The continuous thickness of powder may have a maximum thickness that does not exceed 10 mm. For example in an example aspect the continuous thickness of powder may be 0.1 mm-10 mm, 0.5 to 5 mm, or 0.5 to 1 mm.

When it becomes necessary to remove the support structure 200/300/400/500 from the object 210/310/410/510, the operator may apply force to break the support structure free when connecting ribs are present. The support structure may be removed by mechanical procedures such as twisting, breaking, cutting, grinding, filing, or polishing. Additionally, thermal and chemical post processing procedures may be used to finish the object. When no connecting members are present and instead powder has been placed between the object and the support structure during manufacturing, the powder can simply be removed by blowing, for example, using pressurized air. The removal of the support structure 200/300/400/500 from the object 210/310/410/510 may take place immediately upon or during removal of the object from the powder bed. Alternatively, the support structure may be removed after any one of the post-treatment steps. For example, the object 210/310/410/510 and support structure 200/300/400/500 may be subjected to a post-anneal treatment and/or chemical treatment and then subsequently removed from the object 210/310/410/510 and/or build plate.

Although several examples of support structures and objects have been provided, it should be apparent that other objects may be built in accordance with the present disclosure. For example, any object having high aspect ratio and think walls may be supported by one or more of the disclosed support structures. In an aspect, the disclosed support structures are used to manufacture parts for aircraft. For example, a fuel nozzle similar to the one disclosed in U.S. Pat. No. 9,188,341 may be manufactured using support structures disclosed herein.

In an aspect, multiple supports described above may be used in combination to support fabrication of an object, prevent movement of the object, and/or control thermal properties of the object. That is, fabricating an object using additive manufacturing may include use of one or more of: scaffolding, tie-down supports, break-away supports, lateral supports, conformal supports, connecting supports, keyway supports, breakable supports, leading edge supports, or powder removal ports. The following patent applications include disclosure of these supports and methods of their use:

U.S. patent application Ser. No. 15/042,019, titled "METHOD AND CONFORMAL SUPPORTS FOR ADDITIVE MANUFACTURING" with and filed Feb. 11, 2016;

U.S. patent application Ser. No. 15/042,024, titled "METHOD AND CONNECTING SUPPORTS FOR ADDITIVE MANUFACTURING" with and filed Feb. 11, 2016;

U.S. patent application Ser. No. 15/042,010, titled "METHODS AND KEYWAY SUPPORTS FOR ADDITIVE MANUFACTURING" with filed Feb. 11, 2016;

U.S. patent application Ser. No. 15/042,001, titled "METHODS AND BREAKABLE SUPPORTS FOR ADDITIVE MANUFACTURING" with and filed Feb. 11, 2016;

U.S. patent application Ser. No. 15/041,911, titled "METHODS AND LEADING EDGE SUPPORTS FOR ADDITIVE MANUFACTURING" with and filed Feb. 11, 2016; and U.S. patent application Ser. No. 15/041,980, titled "METHOD AND SUPPORTS WITH POWDER REMOVAL PORTS FOR ADDITIVE MANUFACTURING" with and filed Feb. 11, 2016.

The disclosure of each of these application are incorporated herein in their entirety to the extent they disclose additional support structures that can be used in conjunction with the support structures disclosed herein to make other objects.

Additionally, scaffolding includes supports that are built underneath an object to provide vertical support to the object. Scaffolding may be formed of interconnected supports, for example, in a honeycomb pattern. In an aspect, scaffolding may be solid or include solid portions. The scaffolding contacts the object at various locations providing load bearing support for the object to be constructed above the scaffolding. The contact between the support structure and the object also prevents lateral movement of the object.

Tie-down supports prevent a relatively thin flat object, or at least a first portion (e.g. first layer) of the object from moving during the build process. Relatively thin objects are prone to warping or peeling. For example, heat dissipation may cause a thin object to warp as it cools. As another example, the recoater may cause lateral forces to be applied to the object, which in some cases lifts an edge of the object. In an aspect, the tie-down supports are built beneath the object to tie the object down to an anchor surface. For example, tie-down supports may extend vertically from an anchor surface such as the platform to the object. The tie-down supports are built by melting the powder at a specific location in each layer beneath the object. The tie-down supports connect to both the platform and the object (e.g., at an edge of the object), preventing the object from warping or peeling. The tie-down supports may be removed from the object in a post-processing procedure.

A break-away support structure reduces the contact area between a support structure and the object. For example, a break-away support structure may include separate portions, each separated by a space. The spaces may reduce the total size of the break-away support structure and the amount of powder consumed in fabricating the break-away support structure. Further, one or more of the portions may have a reduced contact surface with the object. For example, a portion of the support structure may have a pointed contact surface that is easier to remove from the object during post-processing. For example, the portion with the pointed contact surface will break away from the object at the pointed contact surface. The pointed contact surface stills provides the functions of providing load bearing support and tying the object down to prevent warping or peeling.

Lateral support structures are used to support a vertical object. The object may have a relatively high height to width aspect ratio (e.g., greater than 1). That is, the height of the object is many times larger than its width. The lateral support structure is located to a side of the object. For example, the object and the lateral support structure are built in the same layers with the scan pattern in each layer including a portion of the object and a portion of the lateral support structure. The lateral support structure is separated from the object (e.g., by a portion of unmelted powder in each layer) or connected by a break-away support structure. Accordingly, the lateral support structure may be easily removed from the object during post-processing. In an aspect, the lateral support structure provides support against forces applied by the recoater when applying additional powder. Generally, the forces applied by the recoater are in the direction of movement of the recoater as it levels an additional layer of powder. Accordingly, the lateral support structure is built in the direction of movement of the recoater from the object. Moreover, the lateral support structure may be wider at the bottom than at the top. The wider bottom provides stability for the lateral support structure to resist any forces generated by the recoater.

Moreover a method of fabricating an object may include consecutively, concurrently, or alternatingly, melting powder to form portions of multiple supports as described above. Additionally, for an object fabricated using multiple supports, the post-processing procedures may include removing each of the supports. In an aspect, a support structure may include multiple supports of different types as described herein. The multiple supports may be connected to each other directly, or via the object. The selection of supports for a specific object may be based on the factors described herein (e.g., shape, aspect ratios, orientation, thermal properties, etc.)

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

The invention claimed is:

1. A method for fabricating an object having a support structure, comprising:
   (a) irradiating a layer of powder in a powder bed to form a fused region;
   (b) providing a subsequent layer of powder over the powder bed by passing a recoater arm over the powder bed; and
   (c) repeating steps (a) and (b) until the object and at least one support structure is formed in the powder bed along a vertical build direction,
   wherein the object comprises a cylinder shape having a height and two end faces spaced apart along the vertical build direction, and the support structure comprises a rectangular shaped outer profile and a cylinder shaped inner profile; and
   wherein the support structure surrounds the object with a layer of powder disposed between the support structure and the object, the layer of powder having a maximum thickness that does not exceed 10 mm.

2. The method of claim 1, wherein the support structure surrounds the entire height of the cylinder.

3. The method of claim 2, wherein the support structure does not surround the end faces.

4. The method of claim 1, wherein the support structure comprises at least one connecting rib.

5. The method of claim 4, wherein the at least one connecting rib is integrally formed with the object.

6. The method of claim 1, wherein the support structure comprises an inner surface defining an inner cavity, the cavity having a shape congruent with the object, the powder being disposed within the cavity.

7. The method of claim 6, wherein the object is disposed within the cavity without contacting the inner surface.

8. The method of claim 7, wherein a ratio (A:B) of a distance from the inner surface of the support to an outer surface of the object (A) to a width of the object (B) is from about 1:1 to about 1:6.

9. The method of claim 7, wherein the support structure comprises at least one connecting rib spanning the area between the object and the inner surface.

10. The method of claim 1, further comprising removing the support structure from the object.

11. The method of claim 1, wherein the object has an aspect ratio of greater than 2.5.

12. The method of claim 1, wherein the support structure comprises a plurality of connecting ribs incrementally spaced along a height of the support structure.

13. The method of claim 1, wherein the support structure comprises a plurality of connecting ribs incrementally spaced along an inner circumferential surface of the support structure.

14. The method of claim 1, wherein the constant thickness of powder has a thickness that of 0.1 mm-10 mm.

15. A method for fabricating an object having a support structure, comprising:
   (a) irradiating a layer of powder in a powder bed to form a fused region;
   (b) providing a subsequent layer of powder over the powder bed by passing a recoater arm over the powder bed; and
   (c) repeating steps (a) and (b) until the object and at least one support structure is formed in the powder bed along a vertical build direction,
   wherein the object comprises a cylinder shape having a height and two end faces spaced apart along the vertical build direction, and the support structure comprises a rectangular shaped outer profile and a cylinder shaped inner profile; and
   wherein the support structure comprises an inner surface defining an inner cavity, the cavity having a shape congruent with the object, the object being disposed within the cavity of the support structure, with a layer of powder disposed between the support structure and the object.

16. The method of claim 15, wherein the support structure comprises an inner surface defining an inner cavity, the cavity having a shape congruent with the object, the powder being disposed within the cavity.

17. The method of claim 16, wherein the object is disposed within the cavity without contacting the inner surface.

18. The method of claim 17, wherein a ratio (A:B) of a distance from the inner surface of the support to an outer surface of the object (A) to a width of the object (B) is from about 1:1 to about 1:6.

19. The method of claim 1, wherein the a thickness of powder is measured along a radial direction between the object and the support structure.

20. The method of claim 15, wherein the a thickness of powder is measured along a radial direction between the object and the support structure.

* * * * *